(12) United States Patent
Hsu et al.

(10) Patent No.: US 10,162,381 B2
(45) Date of Patent: Dec. 25, 2018

(54) HINGED ELECTRONIC DEVICE HELD IN CONFIGURATIONS BY MAGNETS

(71) Applicant: Google Inc., Mountain View, CA (US)

(72) Inventors: Roger Hsu, Mountain View, CA (US); Valentin de la Fuente, San Jose, CA (US); Vivek Saini, Mountain View, CA (US); James Cooper, San Francisco, CA (US); Farzam Sajed, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/465,135

(22) Filed: Mar. 21, 2017

(65) Prior Publication Data

US 2018/0275718 A1 Sep. 27, 2018

(51) Int. Cl.
| | |
|---|---|
| H05K 7/00 | (2006.01) |
| H05K 5/00 | (2006.01) |
| G06F 1/16 | (2006.01) |
| H01F 7/02 | (2006.01) |
| G01C 19/5776 | (2012.01) |
| G01B 7/30 | (2006.01) |

(52) U.S. Cl.
CPC ............ *G06F 1/1618* (2013.01); *G01B 7/30* (2013.01); *G01C 19/5776* (2013.01); *H01F 7/0205* (2013.01)

(58) Field of Classification Search
CPC .................................................. G06F 1/1679
USPC ................................................... 361/679.21
See application file for complete search history.

(56) References Cited

U.S. PATENT DOCUMENTS

| | | |
|---|---|---|
| 8,599,542 B1 | 12/2013 | Healey et al. |
| 8,934,219 B2 | 1/2015 | Gartrell et al. |
| 9,563,231 B2 | 2/2017 | Suzuki et al. |
| 2004/0190239 A1 | 9/2004 | Weng et al. |
| 2007/0133156 A1 | 6/2007 | Ligtenberg et al. |

(Continued)

FOREIGN PATENT DOCUMENTS

WO    2014074102 A1    5/2014

OTHER PUBLICATIONS

"Samsung Chromebook Plus XE513C24-K01US", retrieved on Jan. 18, 2017 from https://web-beta.archive.org/web/20170118064911/http:/www.samsung.com/us/computing/chromebooks/12-14/xe513c24-k01us-xe513c24-k01us, 10 pages.

(Continued)

*Primary Examiner* — Jerry Wu
(74) *Attorney, Agent, or Firm* — Brake Hughes Bellermann LLP

(57) ABSTRACT

An electronic device includes: a first body portion having a first face and a second face; a second body portion having a first face and a second face, the second body portion and the first body portion hinged to each other for the electronic device to define at least a first configuration where the first face of the first body portion is adjacent the first face of the second body portion, and a second configuration where the second face of the first body portion is adjacent the second face of the second body portion; a first magnet mounted to the first body portion; and a second magnet mounted to the second body portion, wherein the first magnet and the second magnet are separated by a common closest distance in the first configuration and in the second configuration.

21 Claims, 10 Drawing Sheets

(56) References Cited

U.S. PATENT DOCUMENTS

| | | |
|---|---|---|
| 2009/0103261 A1 | 4/2009 | Shih et al. |
| 2013/0170126 A1 | 7/2013 | Lee et al. |
| 2014/0002978 A1 | 1/2014 | Ding et al. |
| 2014/0043735 A1* | 2/2014 | Han .................. H05K 7/00 361/679.01 |

OTHER PUBLICATIONS

Colbert, "Lenovo Yoga 13 Magnet Warning", retrieved from http://donovancolbert.blogspot.com/2013/08/lenovo-yoga-13-magnet-warning.html, Aug. 30, 2013, 2 pages.

International Search Report and Written Opinion for Application No. PCT/US2017/058044, dated Feb. 19, 2018, 13 pages.

\* cited by examiner

HINGED ELECTRONIC DEVICE HELD IN CONFIGURATIONS BY MAGNETS

TECHNICAL FIELD

This document relates, generally, to a hinged electronic device that can be held in multiple configurations by magnets.

BACKGROUND

In parallel with the development of thinner and smaller components for electronic devices, such as processors, memories and displays, efforts have also been made to make the devices themselves less bulky. For example, an electronic device that is thinner can be considered commercially advantageous over other devices if it is lighter, looks more appealing, and/or is easier to hold and manipulate in one's hands. With a device such as a laptop computer, however, the process of designing a thinner device can present certain challenges.

SUMMARY

In a first aspect, an electronic device includes: a first body portion having a first face and a second face; a second body portion having a first face and a second face, the second body portion and the first body portion hinged to each other for the electronic device to define at least a first configuration where the first face of the first body portion is adjacent the first face of the second body portion, and a second configuration where the second face of the first body portion is adjacent the second face of the second body portion; a first magnet mounted to the first body portion; and a second magnet mounted to the second body portion, wherein the first magnet and the second magnet are separated by a common closest distance in the first configuration and in the second configuration.

Implementations can include any or all of the following features. The electronic device further includes a hinge that hinges the first body portion and the second body portion to each other, wherein the first magnet and the second magnet are substantially aligned with the hinge. The electronic device further includes a hinge that hinges the first body portion and the second body portion to each other; a third magnet mounted to the first body portion, wherein the first magnet and the third magnet are positioned so that a first resulting magnetic force thereof is substantially aligned with the hinge; and a fourth magnet mounted to the second body portion, wherein the second magnet and the fourth magnet are positioned so that a second resulting magnetic force thereof is substantially aligned with the hinge The electronic device further includes a hinge that hinges a first edge of the first body portion, and a second edge of the second body portion, to each other, wherein the first magnet is positioned at a third edge of the first body portion that is opposite the first edge, and wherein the second magnet is positioned at a fourth edge of the second body portion that is opposite the second edge.

Implementations can include any or all of the following features. The electronic device further includes a hinge that hinges a first edge of the first body portion, and a second edge of the second body portion, to each other, wherein the first magnet is positioned at a third edge of the first body portion that is perpendicular to the first edge, and wherein the second magnet is positioned at a fourth edge of the second body portion that is perpendicular to the second edge. The first magnet and the second magnet form a first magnet pair, the electronic device further comprising: a first hinge that hinges the first body portion and the second body portion to each other, wherein the first magnet pair is substantially aligned with the first hinge; a second hinge that also hinges the first body portion and the second body portion to each other; and a second magnet pair substantially aligned with the second hinge. The first magnet has a first offset from a first centerline of the first body portion, wherein the second magnet has a second offset from a second centerline of the second body portion, and wherein the first and second offsets provide the common closest distance in the first configuration and in the second configuration. The electronic device further includes a display on the first body portion, wherein the first offset is directed away from the display; and a keyboard on the second body portion, wherein the second offset is directed toward the keyboard. The first magnet is positioned inside the first body portion, and the second magnet is positioned inside the second body portion. A first thickness of the first body portion between the first and second faces thereof is greater than a second thickness of the second body portion between the first and second faces thereof, and wherein a first thickness of the first magnet in the first thickness of the first body portion is greater than a second thickness of the second magnet in the second thickness of the second body portion.

Implementations can include any or all of the following features. At least one of the first and second magnets has flanges on at least two sides thereof. The electronic device further includes on at least one of the first and second body portions to which the at least one of the first and second magnets is mounted, a cosmetic layer that covers the at least one of the first and second magnets and is visible from an outside of the one of the first and second body portions. The electronic device further includes in at least one of the first and second body portions to which the at least one of the first and second magnets is mounted, pockets configured to accommodate the flanges, the pockets holding the at least one of the first and second magnets in position. The first magnet has a first pole face and a second pole face, wherein the second magnet has a first pole face and a second pole face, and wherein in the first configuration the first pole face of the first magnet and the second pole face of the second magnet are separated by the common closest distance, and wherein in the second configuration the second pole face of the first magnet and the first pole face of the second magnet are separated by the common closest distance. The electronic device further includes a pocket formed in the first body portion, the pocket configured to accommodate the first magnet, wherein the pocket comprises a thinning of a material thickness applied elsewhere in the first body portion. At least one of the first and second magnets has a permanence coefficient of essentially one.

Implementations can include any or all of the following features. The electronic device further includes a hinge that hinges the first body portion and the second body portion to each other, the hinge comprising a first shaft mounted to the first body portion, a second shaft mounted to the second body portion, and a clamp configured to rotatably hold the first and second shafts, the clamp comprising a housing defining respective bearings for the first and second shafts, the housing comprising a central portion between the bearings, the central portion having an extended portion extending further than the bearings in an axial direction of the first and second shafts so as to abut a generally flat member having holes through which the respective first and second shafts pass. Each of the first and second shafts has a respective flange configured for attachment to a corresponding one of the first and second body portions, and wherein the extended portion is positioned on a same side of the clamp as the flanges of the first and second shafts. The extended portion comprises respective rounded surfaces at the bearings to accommodate the first and second shafts.

Implementations can include any or all of the following features. The electronic device further includes a third magnet mounted at a location in one of the first or second body portion, and a magnet sensor mounted at a corresponding location in the other of the first or second body portion. The electronic device further includes: a keyboard on the first face of the second body portion; and circuitry coupled to the keyboard and to the magnet sensor, the circuitry configured to detect, using the magnet sensor, that the electronic device is in the second configuration, and, based on the detection, deactivate the keyboard. The electronic device further includes: a display on the first face of the first body portion; and circuitry coupled to the display and to the magnet sensor, the circuitry configured to detect, using the magnet sensor, that the electronic device is in the first configuration, and, based on the detection, deactivate the display. The electronic device further includes an accelerometer coupled to the circuitry, wherein the circuitry is further configured to detect, using the accelerometer, an orientation of the electronic device, and, based on the detection of the orientation, control an orientation of an image on the display.

In a second aspect, an electronic device includes: a first body portion having a first face and a second face; a second body portion having a first face and a second face, the second body portion and the first body portion hinged to each other for the electronic device to define at least a first configuration where the first face of the first body portion is adjacent the first face of the second body portion, and a second configuration where the second face of the first body portion is adjacent the second face of the second body portion; and magnetic means, mounted to the first and second body portion, for exerting substantially a common total amount of magnetic force to hold the electronic device in the first configuration as to hold the electronic device in the second configuration.

In a third aspect, an electronic device includes: a first body portion having a first face and a second face; a second body portion having a first face and a second face, the second body portion and the first body portion hinged to each other for the electronic device to define at least a first configuration where the first face of the first body portion is adjacent the first face of the second body portion, and a second configuration where the second face of the first body portion is adjacent the second face of the second body portion; a first magnet mounted to the first body portion without a shunt; and a second magnet mounted to the second body portion without a shunt, wherein the first and second magnets are configured to hold the first and second body portions to each other in the first and second configurations.

BRIEF DESCRIPTION OF DRAWINGS

Like reference symbols in the various drawings indicate like elements.

DETAILED DESCRIPTION

This document describes examples of hinged electronic devices that can be held in any of multiple configurations using magnets. In some implementations, the same pair of magnets can be used to hold a laptop device both in a closed laptop mode and in a tablet mode. For example, the closed laptop mode can have the laptop lid covering a keyboard on a base of the laptop. For example, the tablet mode can have the laptop base folded underneath the lid portion so as to present the laptop display (e.g., a touchscreen) toward the user in the fashion of a tablet device. The pair of magnets can be arranged and configured in the device so that they exert substantially the same amount of magnetic force in the closed laptop mode as in the tablet mode. For example, this can promote consistency in the user experience and can protect against unwanted release of the magnetic attachment.

In laptop computers, one or more hinges is typically used to hinge a lid of the laptop to a base thereof. Each hinge is however in general associated with a certain springback torque, meaning that when one rotates the lid (in this example) to a certain position (e.g., to an arbitrary angle relative to the base), the lid may not stay at that position but may have a tendency to spring back, due to the torque of the hinge itself and flexing of various parts in the entire system. For example, when one seeks to close the lid of the laptop by rotating the lid to the zero degree position, the springback torque can cause the lid to rotate back a certain amount, thereby leaving the laptop not fully closed unless some other mechanism is applied to ensure that it remains closed.

The implementations described herein overcome issues associated with springback torque in a hinged laptop by attaching magnets to the lid and base. The implementations herein are advantageous over approaches that involve shunting, say, the magnet on the lid by placing a steel plate at its back. The shunting helps direct the magnetic force of the lid magnet towards the other magnet placed in the laptop base. However, these approaches are only applicable towards maintaining the device in a single configuration, namely in the closed position.

Figure 1A:
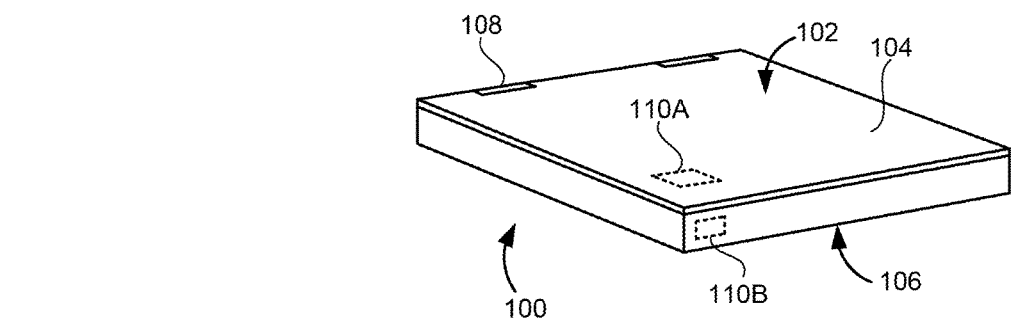
FIGS. 1A-C show an example of an electronic device in various configurations.
Figure 1B:
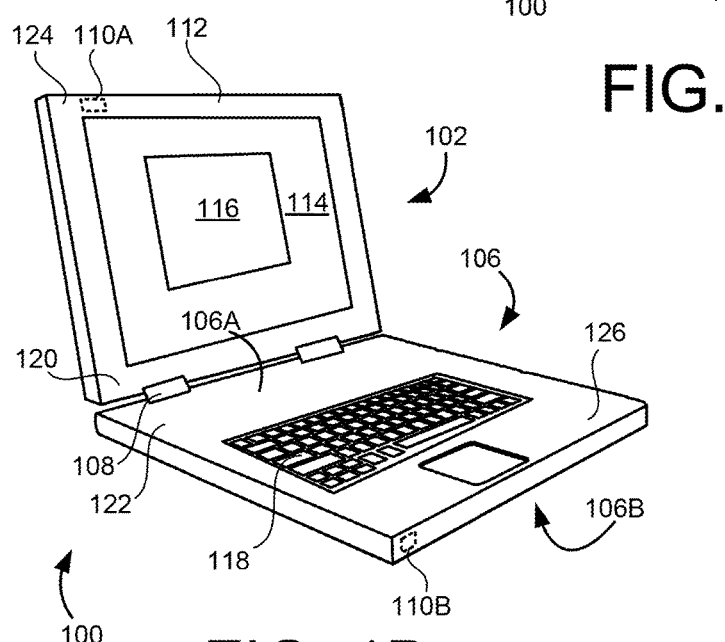
Figure 1C:
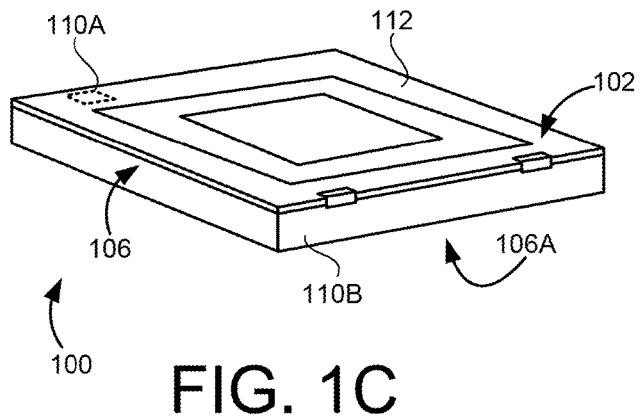

FIGS. 1A-C show an example of an electronic device 100 in various configurations. In some implementations, the electronic device 100 is a laptop device configured to present a display arranged at an adjustable angle relative to a keyboard on the device. For example, the electronic device 100 can include some or all components of the devices described below with reference to FIG. 12.

The electronic device can have two or more body portions, including, but not limited to, a lid and/or a base. FIG.

1A shows that the electronic device 100 includes a lid 102 having at least a main outer face 104, and a main inner face that is not visible in this view. The electronic device 100 here also includes a base 106 having at least a main inner face 106A (FIG. 1B) and outer face 106B (FIG. 1B), neither of which is visible in FIG. 1A. In some implementations, the main outer face 104 and the main inner face of the lid 102 are essentially parallel to each other. In some implementations, the inner and outer faces of the base 106 are essentially parallel to each other. For example, two faces can be considered essentially parallel if they are truly parallel, or if their orientations differ by at most a few degrees from each other.

The electronic device 100 can have one or more hinges connecting the lid 102 and the base 106 to each other. Here, two hinges 108 are shown as an example. The hinge(s) 108 can be separately formed and attached to the lid 102 and the base 106, or can be formed as an integral part of either or both of the lid 102 and base 106. The hinge(s) 108 allows the lid 102 and the base 106 to be rotated relative each other into multiple configurations. Here, the lid 102 has been positioned so that a display on the lid (not shown) is covered by the base 106. This configuration can be considered a closed laptop mode of the electronic device 100.

One or more pairs of magnets can be disposed in the electronic device 100. Here, a magnet 110A is located in the lid 102, and a magnet 110B is located in the base 106. The magnets can be partially or fully enclosed within the corresponding body portion, or not enclosed thereby. For example, either or both of the magnets 110A-B is here positioned inside the corresponding body portion of the electronic device 100. In some implementations, at least one of the magnets 110A-B is mounted in its corresponding body portion without a shunt (e.g., without a steel plate directing its magnetic force).

As will be described in more detail below, magnets can be disposed in electronic devices so as to restrict against unwanted rotation of the lid and/or base in any of multiple configurations of the device. Here, the magnets 110A-B serve to hold the lid 102 and the base 106 of the electronic device 100 to each other in its current position (e.g., a closed laptop mode) and can also hold the lid 102 and the base 106 of the laptop to each other in another configuration (e.g., a tablet mode). The magnets 110A-B can be disposed in the electronic device 100 so that they are separated by essentially the same distance in each of the respective modes.

FIG. 1B shows that the lid 102 and the base 106 of the electronic device 100 have been rotated relative to each other compared to FIG. 1. A main inner face 112 of the lid 102 is currently visible, and here includes a display 114 on which an image 116 is currently presented. The main inner face 106A of the base 106 is visible, while the main outer face 106B of the base 106 is facing in the opposite direction of the main inner face 106A and is currently not visible. The base 106 has a keyboard area 118 on the main inner face 106A, for example including one or more of a full QWERTY keyboard, a numerical keypad, control keys, a pointing stick and/or a track pad. In this configuration, the main inner face 112 of the lid 102, and the main inner face 106A of the base 106, are facing in generally the same direction. For example, the main inner face 112 and the main inner face 106A could both be viewed by a user in this configuration. As such, the user can view the display 114 and can use the keyboard area 118. This configuration can be considered an open laptop mode of the electronic device 100. The electronic device 100 can be moveable between multiple configurations by way of the hinged connection between the lid 102 and the base 106. For example, the electronic device 100 can be continuously moveable to any of such configurations.

As mentioned, relative rotation between the lid 102 and the base 106 is provided by the hinge(s) 108. Here the hinge 108 serves to hinge a bottom edge 120 of the lid 102 and a rear edge 122 of the base 106 to each other. The bottom edge 120 of the lid 102 is opposite a top edge 124 of the lid 102, which in this example is where the magnet 110A is positioned. The rear edge 122 of the base 106, moreover, is opposite a front edge 126 of the base 106, which in this example is where the magnet 110B is positioned.

FIG. 1C shows that the lid 102 and the base 106 of the electronic device 100 can be rotated relative to each other so that the main inner surface 112 of the lid 102 is facing outward (e.g., upward, in some situations), with the base 106 being positioned underneath the lid 102 in this configuration. The magnet 110A in the lid 102 is here indicated, whereas the location of the magnet 110B is obscured in this view. This configuration can be considered a tablet mode of the electronic device 100. In this configuration, the main inner face 112 of the lid 102, and the main inner face 106A of the base 106, are generally facing in opposite directions from each other. The main outer face 104 of the lid 102, and the main outer face 106B of the base 106, which are not visible in this configuration, are facing toward each other. The distance between the magnets 110A-B in the tablet mode can be essentially the same as the distance between the magnets 110A-B in the closed laptop mode (e.g., FIG. 1A). For example, this can facilitate that the magnets 110A-B exert approximately the same magnetic force on the lid 102 and the base 106 in both configurations.

The above example illustrates that the electronic device 100 can have the lid 102 with the main outer face 104 and the main inner face 112, and that the base 106 can have its respective main inner and outer faces. The base 106 and the lid 102 can be hinged to each other for the electronic device 100 to assume at least the closed laptop mode (FIG. 1A), where the main inner face 112 of the lid 102 is adjacent the main inner face of the base 106, and the tablet mode (FIG. 1C) where the main outer face 104 of the lid 102 is adjacent the main outer face of the base 106. The electronic device 100 has the magnet 110A mounted to the lid 102, and the magnet 110B mounted to the base 106, wherein the magnets 110A-B are separated by a common closest distance in the closed laptop mode and in the tablet mode. The lid 102 and base 106 can be hinged to each other such that the electronic device 100 is continuously moveable to multiple configurations between the closed laptop mode and the tablet mode.

The separation of the pair of magnets from each other by the same closest distance (e.g., a distance perpendicular to the faces of the body portions of the electronic device) can facilitate that essentially the same magnetic force is applied in the respective configurations. For example, in the closed laptop mode (FIG. 1A) the magnets 110A-B can exert a certain total amount of magnetic force by way of attraction to each other (e.g., a magnetic north pole of one of the magnets being attracted to a magnetic south pole of the other magnet). Moreover, the magnets 110A-B can be configured and arranged so that they exert the same total magnetic force on each other in the tablet mode as in the closed laptop mode.

Figure 2A:
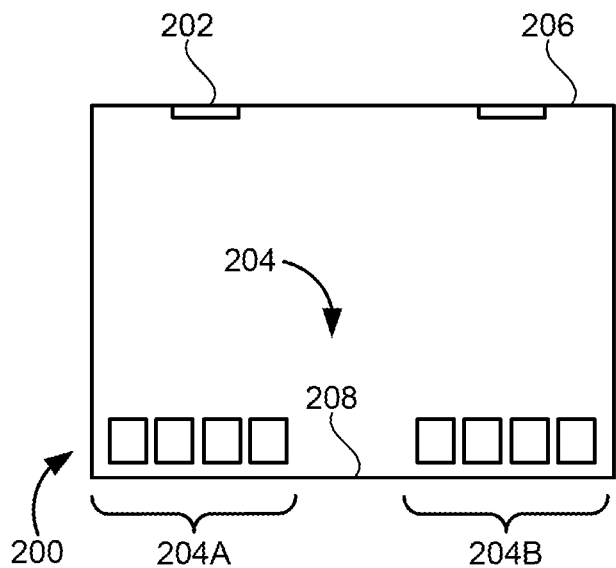
FIGS. 2A-B show examples of magnet placement in a body portion.
Figure 2B:
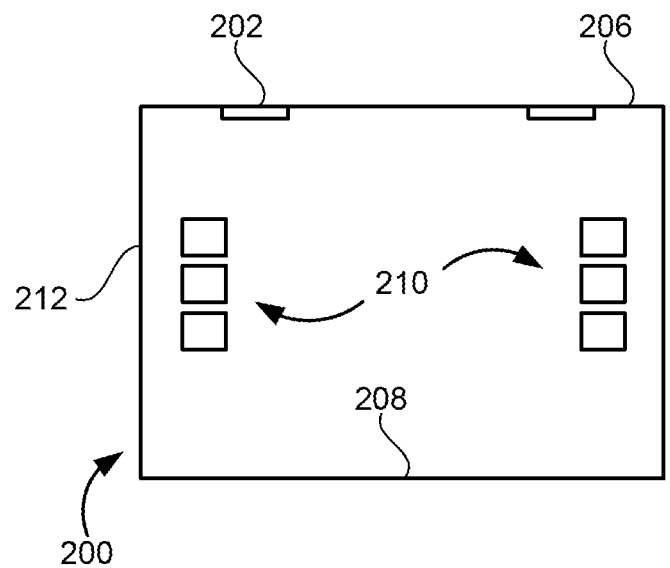

FIGS. 2A-B show examples of magnet placement in a body portion 200. The body portion can be any portion of the housing of a hinged electronic device. For example, the body portion 200 can be a lid or a base of a laptop computer. The body portion 200 can have one or more hinges that couple the body portion 200 to one or more other body portions, for example as described elsewhere herein. Here, the body portion 200 has two hinges 202 on one edge thereof.

The body portion 200 can have one or more magnets mounted therein to hold the electronic device, of which the body portion 200 is part, in any of multiple configurations. FIG. 2A shows an example where the body portion 200 has eight magnets 204 positioned along an edge (in an edge portion) opposite to the edge where the hinges 202 are located. In some implementations, at least one of the magnets 204 is mounted in its corresponding body portion without a shunt.

Placing the magnets 204 relatively far away from the hinge(s) 202 can be advantageous. Namely, the further away that the magnets 204 are from the pivot point of the product, the less force the magnets 204 need to exert to create the rotational moment necessary to counter the springback torque. The relationship is linear, so if the magnets 204 can be placed twice as far away, the force need only be half as strong. Thus, if one wishes to use a relatively smaller and/or weaker magnet 204, it is better to be relatively farther away from the hinges 202.

The magnets 204 can all be of the same type, including, but not limited to, a neodymium-iron alloy. Also, the number of the magnets 204 and/or the shape(s) thereof can be selected based on the surrounding design of the body portion 200. For example, when the body portion 200 is a laptop base, organizing the magnets 204 in two groups can allow an input device (e.g., a trackpad) to extend all the way to the front edge of the laptop base in between the two groups. For example, when the body portion 200 is a laptop lid, organizing the magnets 204 in two groups can allow a device such as a camera to be positioned in between the two groups. Also, choosing to use multiple magnets 204 in the respective group rather than, say only a single magnet, allows the individual magnets 204 to have a more favorable aspect ratio and/or can provide the temperature performance that is desired for the particular electronic device of which the body portion 200 is part.

The magnets 204 in the body portion 200 can have corresponding magnets (not shown) in another body portion that is also part of the electronic device. In some implementations, those other magnets are identical to the magnets 204. In other implementations, one or more of the other magnets can be different from one or more of the magnets 204. For example, when a laptop lid is thinner than a laptop base, then the magnets in the lid can be thinner than the ones in the base.

One or more magnets can be aligned with a corresponding one of the hinges 202. Here a group 204A of the magnets 204 is substantially aligned with one of the hinges 202. For example, the group 204A can be arranged in a row that is perpendicular to the distance between the 204A and the hinge 202. In that row, the magnets of the group 204A can be arranged essentially in a symmetrical fashion about that centerline, for example such that an equal number of magnets are positioned on the respective right and left sides thereof. Similarly, another group 204B of the magnets 204 is here aligned with another one of the hinges 202. A symmetric placement of the magnets in the group 204A and/or 204B with regard to the corresponding hinge 202 can facilitate a better counteracting of the springback torque from that hinge 202. For example, a moment between the magnetic force and the force from the hinge can be eliminated.

The hinges 202 are here positioned at an edge 206 of the body portion 200. For example, this can be the bottom edge of a laptop lid or the rear edge of a laptop base. In either case, the hinge(s) 202 can hinge the edge 206 to a corresponding edge of another body portion of the electronic device. The magnets 204, moreover, are here positioned at an edge 208 of the body portion 200. The edge 208 is opposite to the edge 206 on the body portion 200. Similarly, the magnets (not shown) disposed in the other body portion that is also part of the electronic device can be positioned along a corresponding edge that is opposite to the edge of that body portion that is being hinged by the hinge(s) 202.

The magnets 204 can be positioned on, partially inside, or entirely inside the body portion 200. Similarly, the corresponding magnets (not shown) disposed in the other body portion that is also part of the electronic device can be positioned on, partially inside, or entirely inside that body portion. Namely, the magnets 204 and those other corresponding magnets are positioned so that they exert essentially the same total attractive magnetic force on each other in each of multiple configurations of the electronic device. For example, the attractive magnetic force holding body portions together in a closed laptop mode can be the same amount of force as that which holds the body portions together in a different configuration of the electronic device, say a tablet mode.

FIG. 2B shows an example of another magnet placement in the body portion 200. Here, magnets 210 are also arranged in two groups. Each of the groups 210 is arranged along a respective edge 212 of the body portion 200. Here, each of the edges 212 is perpendicular to the edge 206 that is the location of the hinge(s) 202. Similarly, the magnets (not shown) disposed in the other body portion that is also part of the electronic device can be positioned along one or more edges corresponding to the edge 212 that is perpendicular to the edge of that body portion that is being hinged by the hinge(s) 202. Each group of the magnets 210 can be positioned so that it is essentially aligned with the hinge 202. The magnets 210 are here positioned closer to the hinge(s) 202 than were, say, the magnets 204 in FIG. 2A. It may then be advantageous to use relatively stronger magnets in the present implementation, in order to counteract the springback torque of the hinge(s) 202.

As mentioned above regarding the magnets 204 (FIG. 2A), the magnets 210 can be positioned on, partially inside, or entirely inside the body portion 200. Similarly, the corresponding magnets (not shown) disposed in the other body portion that is also part of the electronic device can be positioned on, partially inside, or entirely inside that body portion. Namely, the magnets 210 and those other corresponding magnets are positioned so that they exert essentially the same total attractive magnetic force on each other in each of multiple configurations of the electronic device. In some implementations, at least one of the magnets 210 is mounted in the body portion 200 without a shunt.

Figure 3A:
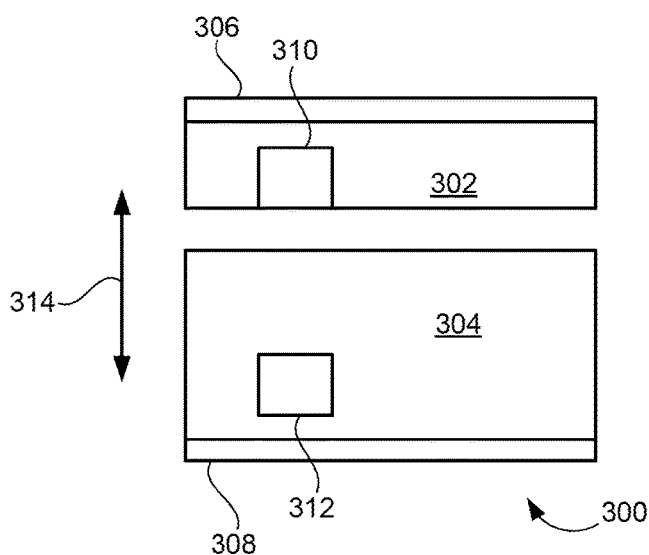
FIGS. 3A-B show examples of magnet separation in different configurations.
Figure 3B:
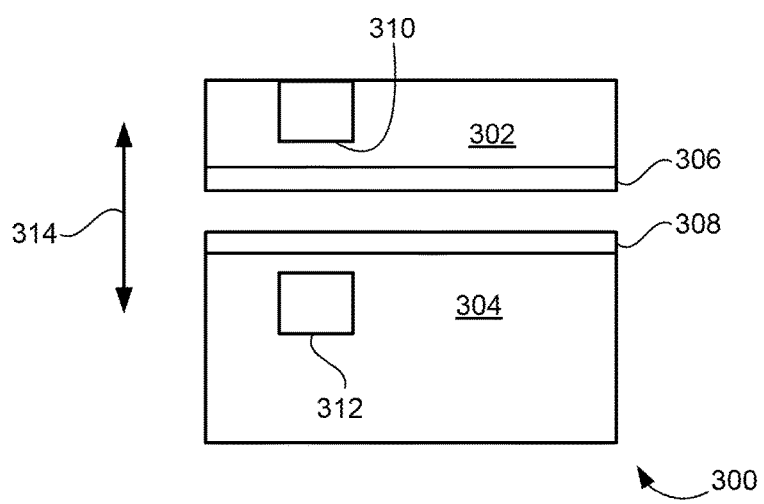

FIGS. 3A-B show examples of magnet separation in different configurations. These examples involve an electronic device 300 having at least respective body portions 302 and 304. For example, body portion 302 can be a laptop lid and body portion 304 can be a laptop base. These body portions 302 and 304 can be hinged to each other using a hinge, which is omitted in the illustration for clarity. Also for clarity, the body portions 302 and 304 are shown separated from each other by some distance.

FIG. 3A shows the electronic device 300 in what can be considered a tablet mode. For example, a display 306 of the body portion 302 is currently facing upward, and a keyboard area 308 of the body portion 304 is currently facing downward.

Each of the body portions 302 and 304 can have one or more magnets mounted therein. Here, the body portion 302 has a magnet 310. The magnet 310 in this example is located in the interior of the body portion 302. The magnet 310 can be positioned in the middle of the thickness of the body portion 302 (e.g., centrally within the depth of a laptop lid) or it can be offset from a central position. Here, the magnet 310 is offset from the central position and is positioned at a location away from the rear of the display 306. For example, the magnet 310 is positioned against a surface of the enclosure that defines the rear of the body portion 302. Accordingly, the magnet 310 is closer to a rear surface of the body portion 302 than a viewing surface of the display 306.

Here, the body portion 306 has a magnet 312. The magnet 312 in this example is located in the interior of the body portion 304. The magnet 312 can be positioned in the middle of the thickness of the body portion 304 (e.g., centrally within the depth of a laptop base) or it can be offset from a central position. Here, the magnet 312 is offset from the central position and is positioned at a location toward the keyboard 308. For example, the magnet 312 is positioned away from a surface of the enclosure that defines the body portion 304. Accordingly, the magnet 310 is closer to the keyboard 308 than the surface of the enclosure of the body portion 304.

Each of the magnets 310 and 312 can be mounted using any suitable technique. For example, an adhesive can be used for attaching the magnet 310 or 312 to the enclosure of the corresponding body portion 302 or 304. In some implementations, at least one of the magnets 310 and 312 is mounted in its corresponding body portion without a shunt.

The magnets 310 and 312 can be separated by a closest distance 314 in the current configuration of the electronic device 300 (e.g., a tablet mode). For example, the distance 314 affects the total amount of magnetic force that attracts the body portions 302 and 304 to each other. In some implementations, the distance 314 can be defined between the center of the magnet 310 and the center of the magnet 312. In some implementations, the distance 314 can be defined between facing surfaces of the respective magnet 310 and the magnet 312.

FIG. 3B shows the electronic device 300 in what can be considered a closed laptop mode. For example, the display 306 of the body portion 302 is currently facing inward/downward so as to cover the keyboard area 308 of the body portion 304. The magnets 310 and 312 are currently attracting the body portions 302 and 304 to each other so as to hold the electronic device 300 in its current configuration. Particularly, because of the arrangement of the magnets 310 and 312 within their respective body portions 302 and 304, they are separated by the same closest distance 314 in this configuration as in the one exemplified by FIG. 3A. For example, the respective offsets of the individual magnets 310 and 312 can be chosen so that the closest distance 314 is the same in at least these two configurations of the electronic device 300. As such, the magnets 310 and 312 can serve to exert substantially the same total amount of magnetic force on the body portions 302 and 304 in at least these two configurations.

Figure 4A:
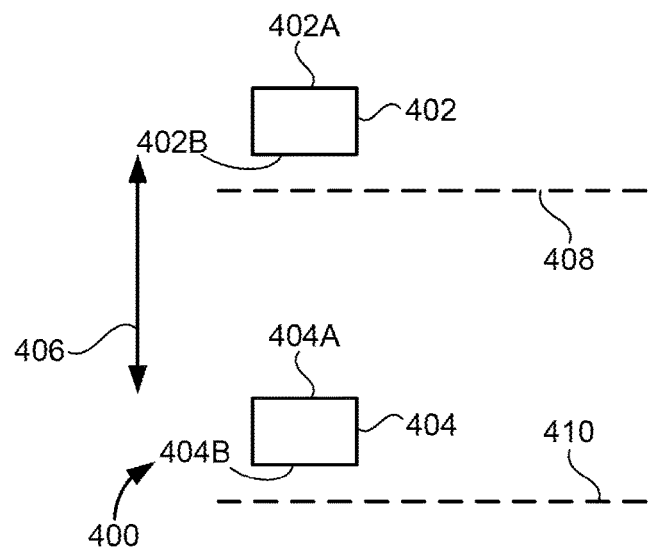
FIGS. 4A-B show other examples of magnet separation in different configurations.
Figure 4B:
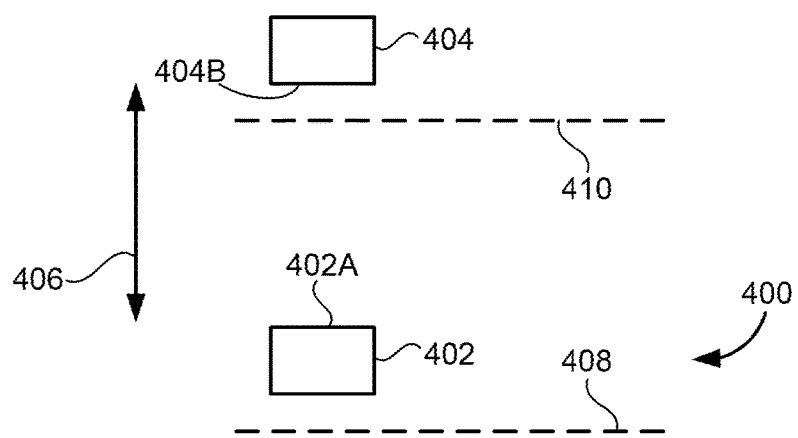

FIGS. 4A-B show other examples of magnet separation in different configurations. These examples involve an electronic device 400 that is here schematically illustrated and represented only by magnets in respective body portions of the electronic device 400. Here, a magnet 402 is disposed in one body portion (e.g., a laptop lid) and a magnet 404 is disposed in another body portion (e.g., a laptop base).

Each magnet has respective faces corresponding to the magnet poles. For example, a face 402A of the magnet 402 can correspond to a north pole of the magnet 402, and a face 402B of the magnet 402 can correspond to a south pole thereof. Similarly, the magnet 404 can have corresponding faces 404A-B that correspond to the respective north and south poles of the magnet 404. FIG. 4A shows the magnet 402 positioned above the magnet 404 so that the face 402B (e.g., a south pole) of the magnet 402 is facing the face 404A (e.g., a north pole) of the magnet 404. As such, the magnets 402 and 404 attract each other in this arrangement so as to hold the electronic device 400 in its current configuration. In some implementations, at least one of the magnets 402 and 404 is mounted in its corresponding body portion without a shunt.

One way to ensure that the magnets 402 and 404 are separated by a common closest distance 406 can be to position each of them centrally within the thickness of its respective body portion of the electronic device 400. Here, a centerline 408 represents the center of the body portion where the magnet 402 is mounted, and a centerline 410 represents the center of the body portion where the magnet 404 is mounted. As such, each of the magnets 402 and 404 can be positioned on the respective centerline 408 or 410. In some implementations, however, an offset from the centerline 408 and/or 410 can be used (as shown in FIGS. 4A and 4B). For example, the design of the electronic device 400 can place constraints on the location of the magnet 402 and/or 404. In such situations, the positions of the magnets 402 and 404 can be shifted in either direction relative to the corresponding centerline 408 and 410. This can be a smaller or larger offset depending on the circumstances.

FIG. 4B shows the body portions of the electronic device 400 in another configuration. The magnets 402 and 404 retain their respective offsets from the centerlines 408 and 410, but the magnet 404 is now positioned above the magnet 402. As such, the face 404B (e.g., a south pole) of the magnet 404 is currently oriented toward the face 402A (e.g., a north pole) of the magnet 402. As such, the magnets 402 and 404 attract each other in this arrangement so as to hold the electronic device 400 in its current configuration. The closest distance 406 between the magnets 404 and 402 in this configuration (FIG. 4B) is the same as the closest distance 406 between them in at least one other configuration (e.g., FIG. 4A). Here, the closest distance 406 is measured from the face 402B to the face 404A (FIG. 4A), as well as from the face 404B to the face 402A (FIG. 4B). As such, the magnets 402 and 404 can serve to exert substantially the same total amount of magnetic force on the respective body portions of the electronic device 400 in at least these two configurations.

Figure 5:
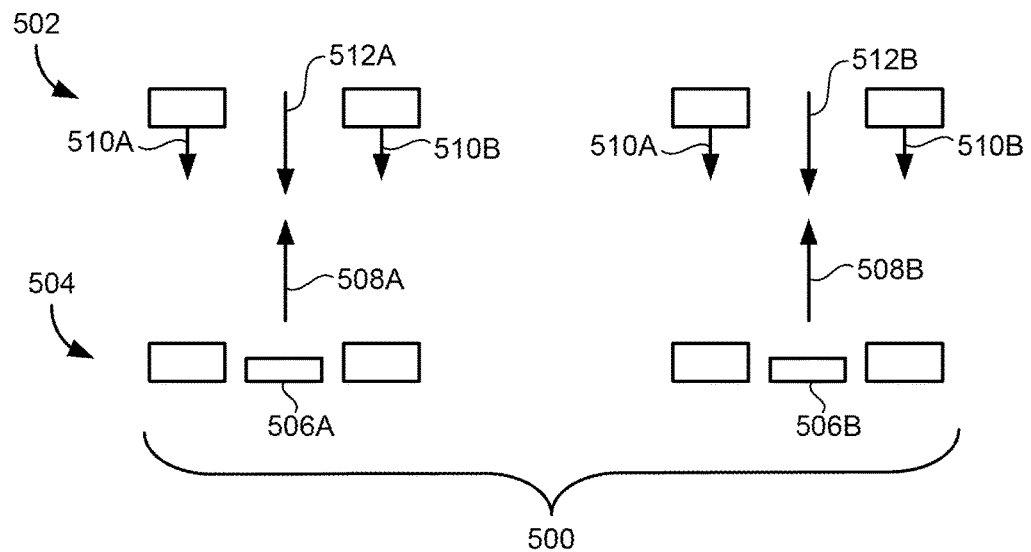
FIG. 5 shows an example of magnets lined up with hinges.

FIG. 5 shows an example of magnets lined up with hinges. This example relates to an electronic device 500 that is here schematically represented by magnets 502, magnets 504 and respective hinges 506A-B. For example, the magnets 502 can be positioned in a body portion of the electronic device (e.g., a lid of a laptop device) and the magnets 504 can be positioned in another body portion of the electronic device 500 (e.g., a base of a laptop device). The hinges 506A-B then serve to hinge these body portions to each other so that the electronic device can define any of multiple configurations, and be held in each of such configurations, by the attractive force of the magnets 502 and 504.

As mentioned, rotation of a hinge can give rise to a springback torque on one or more body portions, the springback torque tending to rotate the body portion(s) in a direction opposite to that of the original rotation. Here, assume that the electronic device 500 is being changed from one configuration to another so that the magnets 502 are being moving toward the magnets 504 (e.g., this can correspond to closing the laptop lid toward the laptop base). The hinges 506A-B then each give rise to a respective springback torque 508A-B that is here schematically illustrated as an arrow. The springback torques 508A-B are here directed upward in the figure because this example assumes that the magnets 502 (i.e., the body portion to which they are mounted) were being moved downward.

The mutual attraction between the magnets 502 and 504 is here schematically illustrated as respective magnetic forces 510A and 510B on the individual ones of the magnets 502. That is, the magnets 502 are being drawn in the direction of the magnets 504 by magnetic forces that are here illustrated as forces 510A-B. Moreover, a resulting magnetic force on the magnets 502 due to the individual forces 510A-B is here illustrated as a force 512A for the magnets 502 on the left side, and a force 512B for the magnets 502 on the right side. That is, the forces 510A-B together affect the magnets 502 as if the force was actually the force 512. Moreover, the magnets 502 are individually positioned so that each of the forces 512A-B is substantially aligned with the corresponding one of the hinges 506A-B. That way, the resulting forces 512A-B can most effectively counteract the respective springback torques 508A-B. That is, two or more of the magnets 502 and 504 can be grouped around the position corresponding to the hinge 506A so that these magnets 502 and 504 collectively generate a force that is aligned with the springback torque 508A. As another example, each of two or more hinges 506A-B can have one or more corresponding magnet pairs associated with it, so as to act against the respective springback torques 508A-B.

The above description regarding the magnets 502 and 504 applies also in at least one other configuration of the electronic device 500, such as one where the magnets 504 are positioned above the magnets 502. The magnets 502 and 504 can therefore serve to exert substantially the same total amount of magnetic force on the respective body portions of the electronic device 500 in at least two configurations. In some implementations, at least one of the magnets 502 and 504 is mounted in its corresponding body portion without a shunt.

Figure 6:
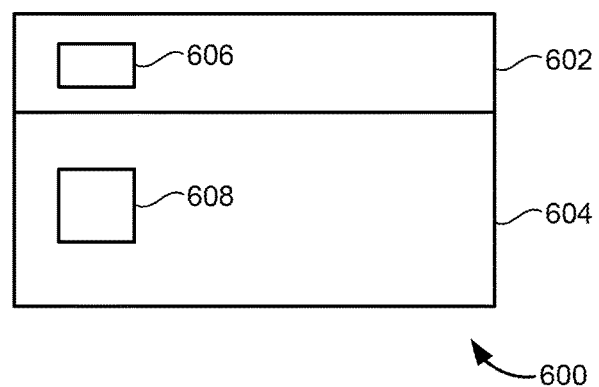
FIG. 6 shows an example of body portion thicknesses and magnet thicknesses.

FIG. 6 shows an example of body portion thicknesses and magnet thicknesses. This example relates to an electronic device 600 having a body portion 602 (e.g., a laptop lid) and a body portion 604 (e.g., a laptop base) hinged to each other. The body portion 602 has a magnet 606 mounted thereto (e.g., inside the body portion 602). Similarly, the body portion 604 has a magnet 608 mounted thereto (e.g., inside the body portion 604). The body portion 602 is here thinner than the body portion 604. The magnet 606 can therefore be selected so that it is thinner than the magnet 608. In some implementations, the magnets 606 and 608 can otherwise have similar aspect ratios. For example, the magnets 606 and 608 can both have a rectangular (e.g., square) cross section that is constant over the length of the magnet. In some implementations, at least one of the magnets 606 and 608 is mounted in its corresponding body portion without a shunt.

The magnets 606 and 608 can serve to hold the electronic device in its current position using a certain magnetic force. If the electronic device were brought into another configuration (e.g., a configuration where the body portion 604 is on top of the body portion 602), the magnets 606 and 608 can serve to hold the electronic device also in that position using approximately the same magnetic force. The magnets 606 and 608 can therefore serve to exert substantially the same total amount of magnetic force on the respective body portions of the electronic device 600 in at least two configurations. In some implementations, the principles of FIGS. 3A-B and/or FIGS. 4A-B can be applied to the electronic device 600.

Figure 7:
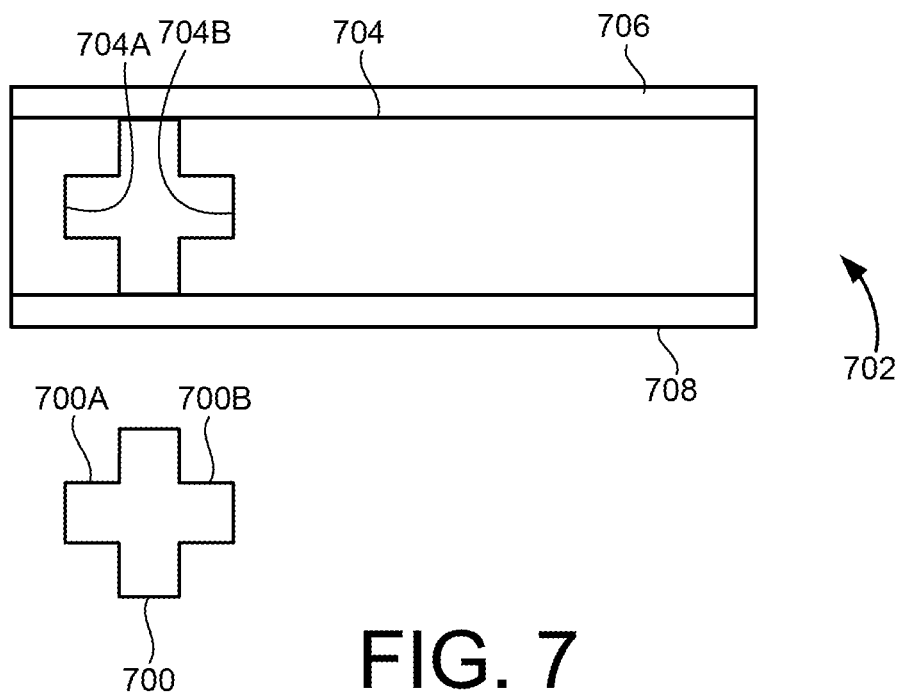
FIG. 7 shows an example of a magnet having flanges.

FIG. 7 shows an example of a magnet 700 having flanges 702A-B. The magnet 700 is configured to be mounted to a body portion 702 of an electronic device (e.g., a lid or a base of a laptop device). When a magnet is mounted inside a body portion that is relatively thin, there is a minimum enclosure thickness of that body portion that needs to be maintained. Otherwise, if the magnet is enclosed by metal sheets that are too thin, certain issues can occur as a result. These issues can include, for example, cosmetic problems, machining issues, and the risk of rupture if pressure is applied near the embedded magnet. Some implementations described herein are designed to have a very thin body portion, such as a thin lid on a laptop device. For example, the thickness on each side of the magnet can be on the order of 0.5 mm. For example, the electronic device can have an inglazed design with glass on at least one side of the body portion 702.

One approach that can be used is to provide the flanges 700A-B on the magnet 700 instead of using a magnet with a rectangular cross section. That is, the body portion 702 can then be made from an enclosure 704 that is provided with pockets 704A-B, each of which is configured to receive a corresponding one of the flanges 700A-B. The enclosure 704 can then support the magnet 700 using these pockets 704A-B. This allows the cross section to be made relatively thin on the top and bottom of the magnet 700 because these elements no longer need to be structural. Instead, these covering materials can be chosen largely depending on what works cosmetically with the rest of the design. In some implementations, at least one of layers 706 and 708 that sandwich the enclosure 704 can be a cosmetic material. This material is then visible from the outside of the body portion 702. For example, a thin film of a selected material (e.g., metal, composite or glass) can be used for the layer 706 and/or 708. In some implementations, the principles of FIGS. 3A-B and/or FIGS. 4A-B can be applied to the electronic device having the body portion 702 and the magnet 700.

Figure 8:
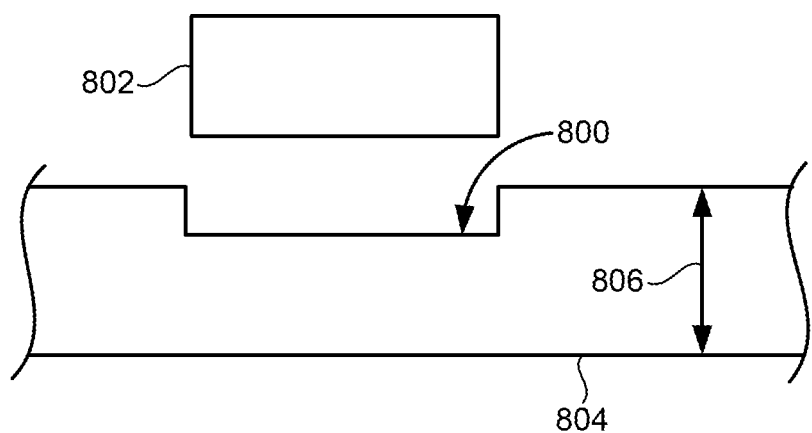
FIG. 8 shows an example of a pocket accommodating a magnet.

FIG. 8 shows an example of a pocket 800 accommodating a magnet 802. The pocket is here formed in an enclosure 804 that is only partially shown. In some implementations, the enclosure 804 can be part of a body portion for an electronic device. For example, the enclosure 804 can be the surface on which any or all of the following exemplary magnets is mounted: magnet 110A and/or 110B (FIGS. 1A-C); magnets 204 and/or 210 (FIGS. 2A-B); magnets 310 and/or 312 (FIGS. 3A-B); magnets 402 and/or 404 (FIGS. 4A-B); magnets 502 and/or 504 (FIG. 5); and magnets 606 and/or 608 (FIG. 6). The magnet 802 can be attached to the enclosure 804 using an adhesive in some implementations.

The magnet 802 can be made from any suitable magnetic material, including, but not limited to, a neodymium-iron alloy. The magnet 802 can have any suitable shape, such as a rectangular (e.g., square) cross section. If the magnet 802 has a large aspect ratio—for example a great length and a small thickness and width—its performance at high temperatures can be less than ideal. In some implementations, permeability of magnets can be a reason to choose to design the electronic device with multiple magnets (e.g., the magnets 204 in FIG. 2A) rather than a single larger magnet. The permeability is related to the permanence coefficient (PC) of the individual magnet. The PC can be calculated based on the magnet's properties. The value of the PC can be said to represent how difficult it is for the magnetic field lines to bend to pass from the north pole of the magnet to the south pole thereof. For example, a tall cylindrical magnet can have a very high PC and a disk magnet can have a very low PC. In some situations, a PC of about one can be considered optimal, for example such that the height of the magnet is equal to its width. In short, the type and size of the magnet(s) can be selected to achieve a particular temperature performance, and also to satisfy size and/or cost constraints in the design on the electronic device.

In some implementations, the electronic device having the enclosure 804 can be of a unibody design made of a common material. For example, aluminum can be used. Such a body portion can have a nominal thickness 806 defined all around to ensure that stiffness is maintained. Locally, however, the pocket 800 can be formed as a thinning of the material thickness of the enclosure 804 to allow use of the magnet 802 having a particular cross section, without the magnet 802 protruding too much above the surface of the enclosure 804. The pocket 800 controls the position of the magnet 802 relative to the enclosure 804 and the rest of the body portion. As such, the pocket 800 can be used to ensure that the magnet 802 is positioned correctly so as to have the same distance to another magnet (not shown) in each of multiple configurations. For example, the pocket 800 can provide an offset of the magnet 802 from a centerline of the body portion formed by the enclosure 804.

Figure 9A:
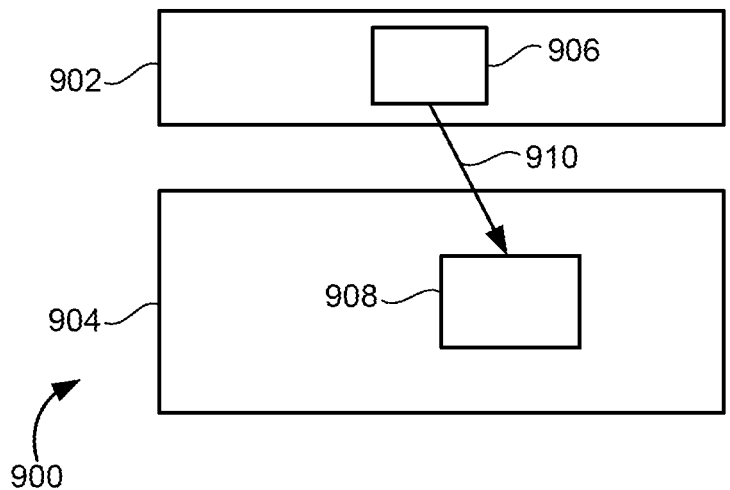
FIGS. 9A-B show examples of hinge position detection.
Figure 9B:
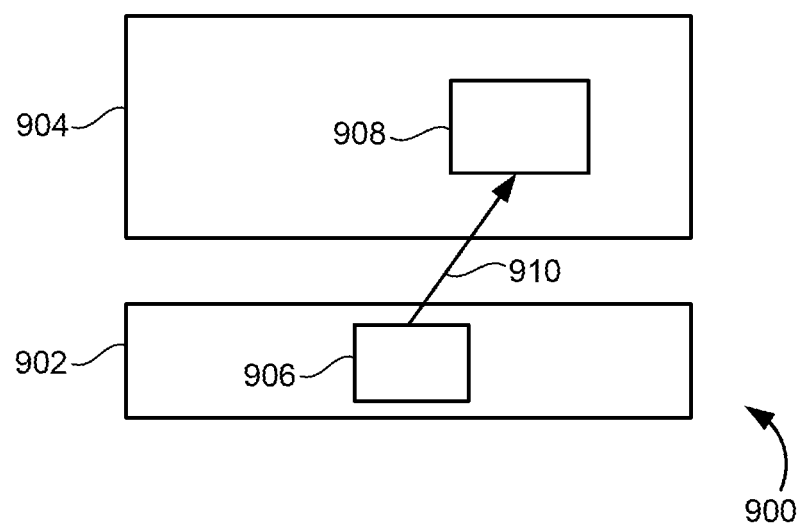

FIGS. 9A-B show examples of hinge position detection. This example relates to an electronic device 900 having a body portion 902 (e.g., a laptop lid) and a body portion 904 (e.g., a laptop base) hinged to each other. The electronic device 900 can also be brought into another configuration (e.g., a configuration where the body portion 904 is on top of the body portion 902). It can therefore be useful to detect, by way of determining the position of the hinge connecting these body portion, whether the electronic device 900 is in one or the other of these configurations. For example, the configuration shown in FIG. 9A can be characterized as having the hinge at zero degrees rotation, and the configuration shown in FIG. 9B can be characterized as having the hinge at 360 degrees rotation.

A magnet can be provided in one of the body portions 902 and 904 and a magnet sensor can be provided in the other of the body portions 902 and 904. Here, a magnet 906 is provided in the body portion 902 and a magnet sensor 908 is provided in the body portion 904. The magnet 906 can be any suitable type of magnet, including those exemplified elsewhere herein. The magnet sensor can be any suitable sensor that can detect the presence of the magnet 906 in such a way that the various configurations can be distinguished from each other. For example, a giant magnetoresistance (GMR) sensor can be used for the magnet sensor 908. The magnet 906 and the magnet sensor 908 are offset by a certain amount. As a result, the magnet 906 is above and to the left of the magnet sensor 908 in the configuration shown in FIG. 9A, and is below and to the left of the magnet sensor 908 in the configuration shown in FIG. 9B. For example, the magnetic field can be differently oriented in closed laptop mode than in tablet mode.

The magnet sensor 908 detects a magnetic field 910 from the magnet 906. For example, in FIG. 9A the magnet sensor 908 can generate a signal indicating that the magnet 906 is above and to the left of the magnet sensor 908. For example, this can be interpreted to mean that the hinge is at the zero degree position. Correspondingly, in FIG. 9B the magnet sensor 908 can generate a signal indicating that is below and to the left of the magnet sensor 908. For example, this can be interpreted to mean that the hinge is at the 360 degree position. The electronic device 900 can use the signal or other indication from the magnet sensor in one or more ways, for example as will now be described.

Figure 10:
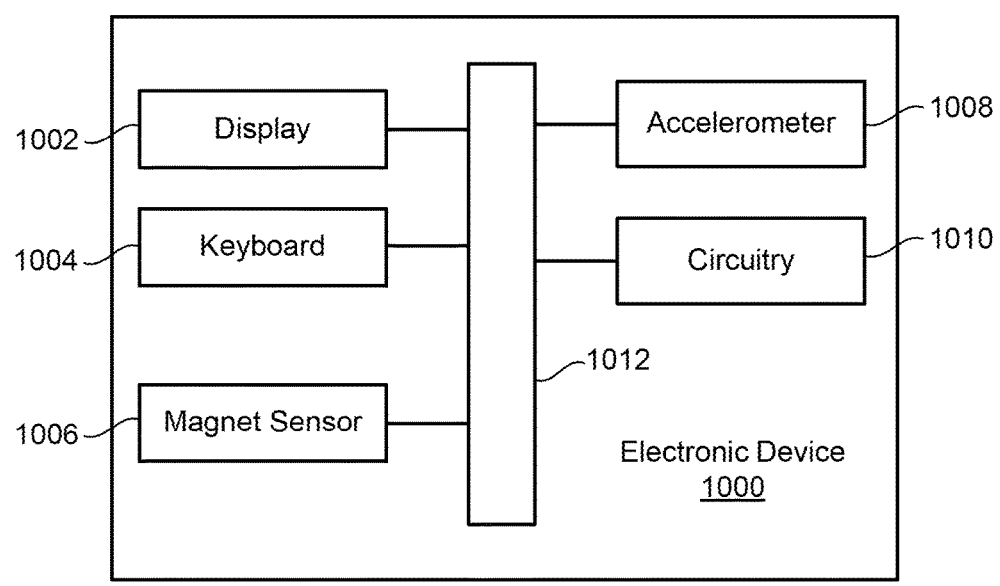
FIG. 10 shows an example of a system for an electronic device.

FIG. 10 shows an example of a system for an electronic device 1000. The system includes a display 1002, a keyboard 1004, a magnet sensor 1006, an accelerometer 1008 and one or more implementations of circuitry 1010, all interconnected by at least one bus 1012 in the system. In some implementations, the keyboard 1004 is positioned on a body portion of the electronic device 1000 (e.g., on a laptop base). The magnet sensor 1006 can be mounted at a location in that or another body portion of the electronic device 1000. The circuitry 1010, moreover, can be coupled to the keyboard 1004 and to the magnet sensor 1006. The circuitry 1010 can be configured to detect the current configuration of the electronic device (e.g., whether a laptop device is in tablet mode or in a closed laptop mode). For example, if the circuitry detects that the electronic device 1000 is in a tablet mode where input should be made mainly through a touchscreen of the display 1002, then the circuitry can deactivate the keyboard 1004 in response to such a detection.

The circuitry 1010 can also or instead be coupled to the display 1002 as well as to the magnet sensor 1006. The circuitry 1010 which is configured to detect the current configuration of the electronic device can then for example detect that the electronic device 1000 is in a closed laptop mode where the display 1002 should be turned off, and can deactivate the display 1002 in response to such a detection.

The circuitry 1010 can also or instead be coupled to the accelerometer 1008. The accelerometer 1008 can be configured so that it indicates an orientation of the electronic device 1000, such as relative to the Earth's gravitational field. The circuitry 1010 can then be configured to detect, using the accelerometer, the orientation of the electronic device 1000, such as whether the electronic device 1000 is oriented in a horizontal direction or in a vertical direction. Based on such a detection, the circuitry 1010 can control the orientation of an image on the display 1002. For example, the image 116 on the display 114 (FIG. 1) can be controlled to be presented in either a landscape orientation or a portrait orientation based on such a detection.

Figure 11:
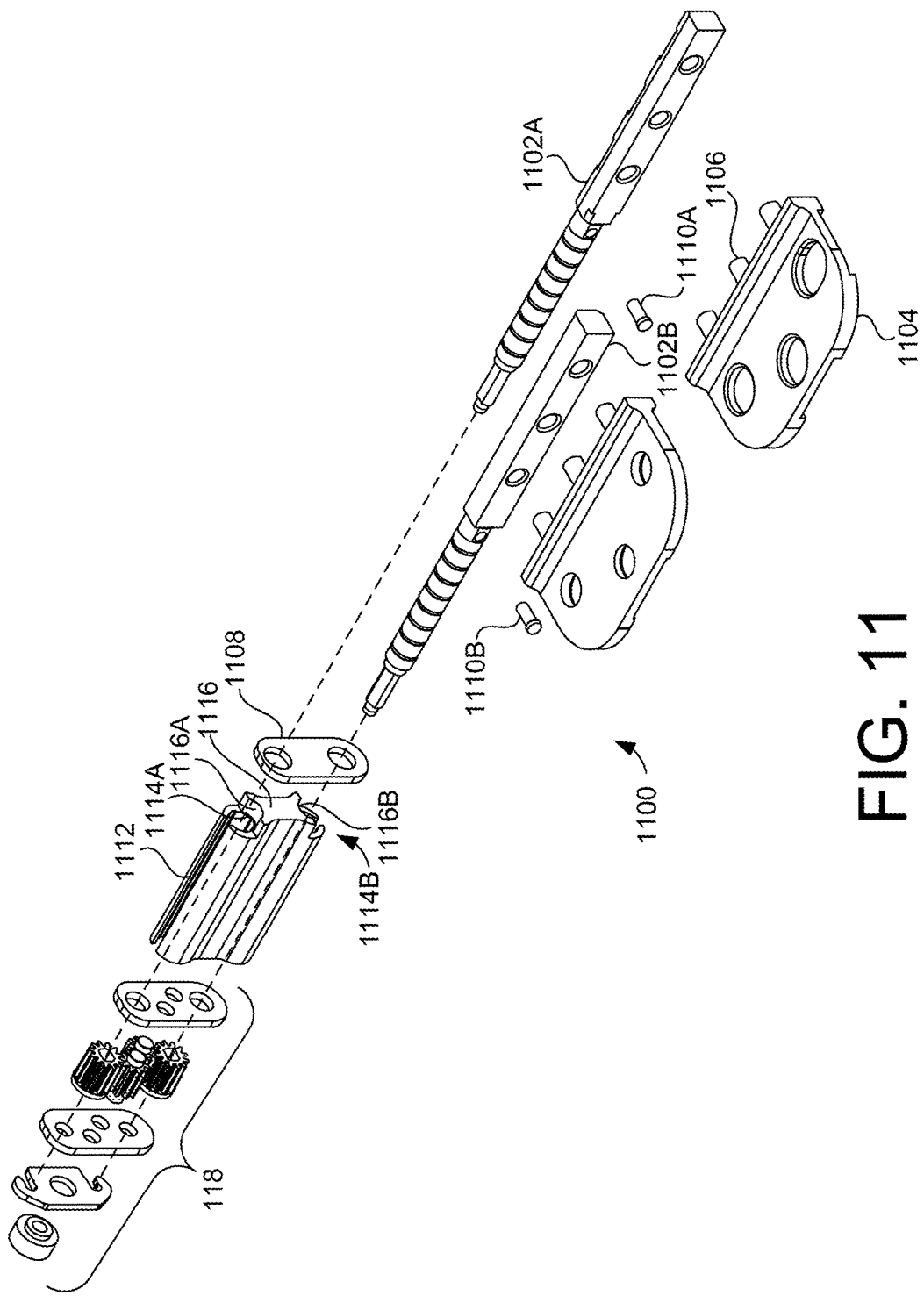
FIG. 11 shows examples of a hinge for a thin electronic device.

FIG. 11 shows examples of a hinge 1100 for a thin electronic device. When creating a hinge for a hinged electronic device that is to have a very small thickness, several considerations must be taken into account so that the dimensions of the device and its components are proper for the implementation, for example so that the device is optimized for strength. In some implementations, a hinged laptop having a thickness on the order of 10 mm can be created using the hinge 1100. For example, this can require strengthening various parts of the hinge design so that they are robust enough. The electronic device can have one or more of the hinge 1100. For example, the hinge 1100 can be considered the right hinge and the electronic device can then also have a corresponding mirror image version of the hinge 1100 as a left hinge. Other approaches can be used.

The hinge 1100 includes respective shafts 1102A-B. Each of the shafts is configured to have a corresponding flange 1104 attached thereto, for example attached by way of one or more pins 1106. The flanges 1104 are configured for attaching the hinge 1100 to a respective body portion of an electronic device. For example, one of the flanges 1104 can be mounted to (e.g., screwed into by way of bolts) a laptop lid, and the other one of the flanges 1104 can be mounted to a laptop base, so as to hinge them to each other.

A flat member 1108 has respective openings for the shafts 1102A-B. The flat member 1108 and the shafts 1102A-B can be held in position relative to each other using at least one pin 1110A-B that extends from the corresponding shaft 1102A or 1102B between the flat member 1108 and the tip of that corresponding shaft 1102A or 1102B, thus restricting the movement between the flat member 1108 and the corresponding shaft 1102A or 1102B.

A clamp 1112 is configured for receiving at least the respective ends of the shafts 1102A-B so as to rotatably hold the shafts 1102A-B and provide a certain amount of friction to the rotation of each of the shafts 1102A-B. The clamp 1112 has bearings 1114A-B that accommodate the respective shafts 1102A-B. For example, each of the bearings 1114A-B can provide an axial bore through the clamp 1112. The clamp 1112 can thus include a housing that is generally made up of the bearings 1114A-B, separated by a central portion in the clamp 1112.

The friction between the clamp 1112 and the corresponding shaft 1102A or 1102B can be provided by an interference fit. When the hinge 1100 is being designed to work in a laptop or other hinged device that has particularly small dimensions it can take significant effort to ensure that the implementation of the hinge 1100 on a very small scale in size nevertheless produces a satisfactory solution. Several constraints must be taken into account, such as the need for either or both of the shafts 1102A-B to be centered within the corresponding body portion (e.g., a lid or base) of the electronic device. For example, a lid in particular is typically thinner than the base of a laptop and the available room to hold the hinge 1100 and, say, the shaft 1102A must then be narrowly dimensioned so as to fit in the available space.

The clamp 1112 in some implementations is optimized so as to provide the required interference fit about in a reliable manner. In some implementations, each of the bearings 1114A-B can provide a partially open cylinder that partially embraces one of the shafts 1102A-B. For example, the cylinder can have an axially extending opening that provides a certain clamping pressure about the inserted shaft 1102A-B. Computer simulations can be performed, using dimensional physical geometry, so as to take into account the applicable constraints, to see where material can be taken away to accommodate the existing enclosures, and to ensure that the design stays within the necessary tolerances. For example, the structure of such partially open cylinder of each of the bearings 1114A-B can be optimized so as to maximize its structural integrity and ability to securely hold the shaft 1102A-B and provide the required interference fit. At the same time it should be ensured that the outer dimensions of the clamp 1112, in particular the dimensions of the partially open cylinder which may be at the outermost parts of the envelope defined by the overall structure of the clamp 1112, are acceptable.

As mentioned, the hinge 1100 is suitable for use in a very thin hinged electronic device. Here, one feature of the clamp 1112 of the hinge 1100 is an extended portion 1116 on the central portion of the clamp 1112. The extended portion 1116 here extends in a generally axial direction (referring to the axes of the shafts 1102A-B), further than the bearings 1114A-B. In some implementations, the extended portion 1116 extends on one side of the clamp 1112. For example, the extended portion 1116 can extend on a same side of the clamp 1112 as where the flanges 1104 of the shafts 1102A-B are positioned when the hinge 1100 is assembled. The extended portion 1116 can extend so as to abut the flat member 1108 when the hinge 1100 is assembled. The extended portion 1116 can have respective rounded surfaces 1116A-B, here one for each of the bearings 1114A-B. For example, the rounded surfaces 1116A-B can accommodate parts of the respective shafts 1102A-B during rotation thereof after the hinge 1100 is assembled.

The clamp 1112 can also facilitate synchronization of the rotation of the shafts 1102A-B with each other. In some implementations, it can be important that the shafts 1102A-B rotate in a very consistent manner, for example so that one hinge does not rotate more than the other, which can result in the hinges eventually locking up. Here, a gear assembly 1118 is provided for being mounted at the other end of the clamp 1112. The gear assembly 1118 here includes an assembly of gears, flat members and other components that attach to the ends of the shafts 1102A-B so as to facilitate a synchronized rotation thereof.

Figure 12:
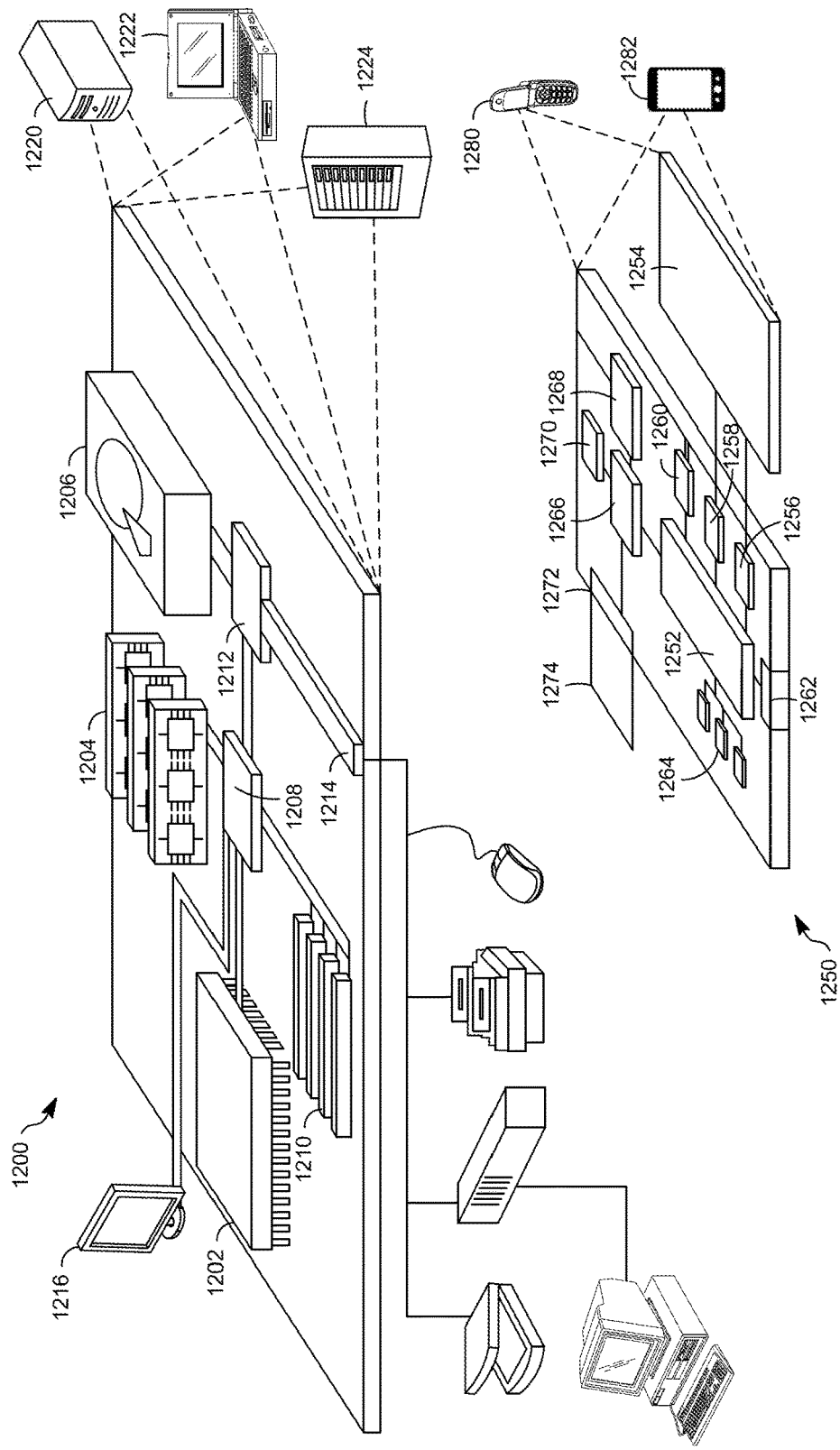
FIG. 12 shows an example of a computer device and a mobile computer device that can be used to implement the techniques described here.

FIG. 12 shows an example of a generic computer device 1200 and a generic mobile computer device 1250, which may be used with the techniques described here. Computing device 1200 is intended to represent various forms of digital computers, such as laptops, desktops, tablets, workstations, personal digital assistants, televisions, servers, blade servers, mainframes, and other appropriate computing devices. Computing device 1250 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1200 includes a processor 1202, memory 1204, a storage device 1206, a high-speed interface 1208 connecting to memory 1204 and high-speed expansion ports 1210, and a low speed interface 1212 connecting to low speed bus 1214 and storage device 1206. The processor 1202 can be a semiconductor-based processor. The memory 1204 can be a semiconductor-based memory. Each of the components 1202, 1204, 1206, 1208, 1210, and 1212, are interconnected using various busses, and may be mounted on a common motherboard or in other manners as appropriate. The processor 1202 can process instructions for execution within the computing device 1200, including instructions stored in the memory 1204 or on the storage device 1206 to display graphical information for a GUI on an external input/output device, such as display 1216 coupled to high speed interface 1208. In other implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

The memory 1204 stores information within the computing device 1200. In one implementation, the memory 1204 is a volatile memory unit or units. In another implementation, the memory 1204 is a non-volatile memory unit or units. The memory 1204 may also be another form of computer-readable medium, such as a magnetic or optical disk.

The storage device 1206 is capable of providing mass storage for the computing device 1200. In one implementation, the storage device 1206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1204, the storage device 1206, or memory on processor 1202.

The high speed controller 1208 manages bandwidth-intensive operations for the computing device 1200, while the low speed controller 1212 manages lower bandwidth-intensive operations. Such allocation of functions is exemplary only. In one implementation, the high-speed controller 1208 is coupled to memory 1204, display 1216 (e.g., through a graphics processor or accelerator), and to high-speed expansion ports 1210, which may accept various expansion cards (not shown). In the implementation, low-speed controller 1212 is coupled to storage device 1206 and low-speed expansion port 1214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1220, or multiple times in a group of such servers. It may also be implemented as part of a rack server system 1224. In addition, it may be implemented in a personal computer such as a laptop computer 1222. Alternatively, components from computing device 1200 may be combined with other components in a mobile device (not shown), such as device 1250. Each of such devices may contain one or more of computing device 1200, 1250, and an entire system may be made up of multiple computing devices 1200, 1250 communicating with each other.

Computing device 1250 includes a processor 1252, memory 1264, an input/output device such as a display 1254, a communication interface 1266, and a transceiver 1268, among other components. The device 1250 may also be provided with a storage device, such as a microdrive or other device, to provide additional storage. Each of the components 1250, 1252, 1264, 1254, 1266, and 1268, are interconnected using various buses, and several of the components may be mounted on a common motherboard or in other manners as appropriate.

The processor 1252 can execute instructions within the computing device 1250, including instructions stored in the memory 1264. The processor may be implemented as a chipset of chips that include separate and multiple analog and digital processors. The processor may provide, for example, for coordination of the other components of the device 1250, such as control of user interfaces, applications run by device 1250, and wireless communication by device 1250.

Processor 1252 may communicate with a user through control interface 1258 and display interface 1256 coupled to a display 1254. The display 1254 may be, for example, a TFT LCD (Thin-Film-Transistor Liquid Crystal Display) or an OLED (Organic Light Emitting Diode) display, or other appropriate display technology. The display interface 1256 may comprise appropriate circuitry for driving the display 1254 to present graphical and other information to a user. The control interface 1258 may receive commands from a user and convert them for submission to the processor 1252. In addition, an external interface 1262 may be provided in communication with processor 1252, so as to enable near area communication of device 1250 with other devices. External interface 1262 may provide, for example, for wired communication in some implementations, or for wireless communication in other implementations, and multiple interfaces may also be used.

The memory 1264 stores information within the computing device 1250. The memory 1264 can be implemented as one or more of a computer-readable medium or media, a volatile memory unit or units, or a non-volatile memory unit or units. Expansion memory 1274 may also be provided and connected to device 1250 through expansion interface 1272, which may include, for example, a SIMM (Single In Line Memory Module) card interface. Such expansion memory 1274 may provide extra storage space for device 1250, or may also store applications or other information for device 1250. Specifically, expansion memory 1274 may include instructions to carry out or supplement the processes described above, and may include secure information also. Thus, for example, expansion memory 1274 may be provided as a security module for device 1250, and may be programmed with instructions that permit secure use of device 1250. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1264, expansion memory 1274, or memory on processor 1252, that may be received, for example, over transceiver 1268 or external interface 1262.

Device 1250 may communicate wirelessly through communication interface 1266, which may include digital signal processing circuitry where necessary. Communication interface 1266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1268. In addition, short-range communication may occur, such as using a Bluetooth, WiFi, or other such transceiver (not shown). In addition, GPS (Global Positioning System) receiver module 1270 may provide additional navigation- and location-related wireless data to device 1250, which may be used as appropriate by applications running on device 1250.

Device 1250 may also communicate audibly using audio codec 1260, which may receive spoken information from a user and convert it to usable digital information. Audio codec 1260 may likewise generate audible sound for a user, such as through a speaker, e.g., in a handset of device 1250. Such sound may include sound from voice telephone calls, may include recorded sound (e.g., voice messages, music files, etc.) and may also include sound generated by applications operating on device 1250.

The computing device 1250 may be implemented in a number of different forms, as shown in the figure. For example, it may be implemented as a cellular telephone 1280. It may also be implemented as part of a smart phone 1282, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. An electronic device comprising:
   a first body portion having a first face and a second face;
   a second body portion having a first face and a second face, the second body portion and the first body portion hinged to each other by a first hinge that hinges a first edge of the first body portion, and a second edge of the second body portion, to each other to facilitate rotation of at least one of the first or second body portions into at least a first configuration where the first face of the first body portion is adjacent the first face of the second body portion, and into a second configuration where the second face of the first body portion is adjacent the second face of the second body portion, wherein the rotation gives rise to a springback torque on one or more of the first or second body portions, the springback torque tending to rotate the one or more of the first or second body portions in a direction opposite that of the rotation;
   a first magnet positioned at a third edge of the first body portion that is opposite the first edge;
   a second magnet positioned at a fourth edge of the second body portion
   a third magnet positioned at the third edge of the first body portion; and
   a fourth magnet positioned at the fourth edge of the second body portion;
   wherein the first and third magnets are placed symmetrically about a first point on the third edge directly across the first body portion from the first hinge so that a first resulting magnetic force of the first and third magnets is substantially aligned with the first hinge, and wherein the second and fourth magnets are placed symmetrically about a second point on the fourth edge directly across the second body portion from the first hinge so that a second resulting magnetic force of the second and fourth magnets is substantially aligned with the first hinge, the first and second resulting magnetic forces counteracting the springback torque; and
   wherein the first magnet and the second magnet are separated by a common closest distance in the first configuration and in the second configuration.

2. The electronic device of claim 1, wherein the first magnet and the second magnet form a first magnet pair, the electronic device further comprising:
   a second hinge that also hinges the first body portion and the second body portion to each other; and
   fifth, sixth, seventh and eighth magnets associated with the second hinge.

3. The electronic device of claim 1, wherein the first magnet has a first offset from a first centerline of the first body portion, wherein the second magnet has a second offset from a second centerline of the second body portion, and wherein the first and second offsets provide the common closest distance in the first configuration and in the second configuration.

4. The electronic device of claim 3, further comprising:
   a display on the first body portion, wherein the first offset is directed away from the display; and
   a keyboard on the second body portion, wherein the second offset is directed toward the keyboard.

5. The electronic device of claim 1, wherein the first magnet is positioned inside the first body portion, and the second magnet is positioned inside the second body portion.

6. The electronic device of claim 1, wherein a first thickness of the first body portion between the first and second faces thereof is greater than a second thickness of the second body portion between the first and second faces thereof, and wherein a first thickness of the first magnet in the first thickness of the first body portion is greater than a second thickness of the second magnet in the second thickness of the second body portion.

7. The electronic device of claim 1, wherein at least one of the first and second magnets has flanges on at least two sides thereof.

8. The electronic device of claim 7, further comprising, on at least one of the first and second body portions to which the at least one of the first and second magnets is mounted, a cosmetic layer that covers the at least one of the first and second magnets and is visible from an outside of the one of the first and second body portions.

9. The electronic device of claim 7, further comprising, in at least one of the first and second body portions to which the at least one of the first and second magnets is mounted, pockets configured to accommodate the flanges, the pockets holding the at least one of the first and second magnets in position.

10. The electronic device of claim 1, wherein the first magnet has a first pole face and a second pole face, wherein the second magnet has a first pole face and a second pole face, and wherein in the first configuration the first pole face of the first magnet and the second pole face of the second magnet are separated by the common closest distance, and wherein in the second configuration the second pole face of the first magnet and the first pole face of the second magnet are separated by the common closest distance.

11. The electronic device of claim 1, further comprising a pocket formed in the first body portion, the pocket configured to accommodate the first magnet, wherein the pocket comprises a thinning of a material thickness applied elsewhere in the first body portion.

12. The electronic device of claim 1, wherein at least one of the first and second magnets has a permanence coefficient of essentially one.

13. The electronic device of claim 1, the first hinge comprising a first shaft mounted to the first body portion, a second shaft mounted to the second body portion, and a clamp configured to rotatably hold the first and second shafts, the clamp comprising a housing defining respective bearings for the first and second shafts, the housing comprising a central portion between the bearings, the central portion having an extended portion extending further than the bearings in an axial direction of the first and second shafts so as to abut a generally flat member having holes through which the respective first and second shafts pass.

14. The electronic device of claim 13, wherein each of the first and second shafts has a respective flange configured for attachment to a corresponding one of the first and second body portions, and wherein the extended portion is positioned on a same side of the clamp as the flanges of the first and second shafts.

15. The electronic device of claim 13, wherein the extended portion comprises respective rounded surfaces at the bearings to accommodate the first and second shafts.

16. The electronic device of claim 1, further comprising a fifth magnet mounted at a location on one of the first or second body portion, and a magnet sensor mounted at a corresponding location on the other of the first or second body portion.

17. The electronic device of claim 16, further comprising:
a keyboard on the first face of the second body portion; and
circuitry coupled to the keyboard and to the magnet sensor, the circuitry configured to detect, using the magnet sensor, that the electronic device is in the second configuration, and, based on the detection, deactivate the keyboard.

18. The electronic device of claim 16, further comprising:
a display on the first face of the first body portion; and
circuitry coupled to the display and to the magnet sensor, the circuitry configured to detect, using the magnet sensor, that the electronic device is in the first configuration, and, based on the detection, deactivate the display.

19. The electronic device of claim 18, further comprising an accelerometer coupled to the circuitry, wherein the circuitry is further configured to detect, using the accelerometer, an orientation of the electronic device, and, based on the detection of the orientation, control an orientation of an image on the display.

20. An electronic device comprising:
a first body portion having a first face and a second face;
a second body portion having a first face and a second face, the second body portion and the first body portion hinged to each other by a first hinge that hinges a first edge of the first body portion, and a second edge of the second body portion, to each other to facilitate rotation of at least one of the first or second body portions into at least a first configuration where the first face of the first body portion is adjacent the first face of the second body portion, and into a second configuration where the second face of the first body portion is adjacent the second face of the second body portion, wherein the rotation gives rise to a springback torque on one or more of the first or second body portions, the springback torque tending to rotate the one or more of the first or second body portions in a direction opposite that of the rotation; and
magnetic means, mounted to a third edge of the first body portion and to a fourth edge of the second body portion, for exerting substantially a common total amount of magnetic force to hold the electronic device in the first configuration as to hold the electronic device in the second configuration, wherein the magnetic means are placed symmetrically about a first point on the third edge directly across the first body portion from the first hinge so that a first resulting magnetic force is substantially aligned with the first hinge, and wherein the magnetic means are placed symmetrically about a second point on the fourth edge directly across the second body portion from the first hinge so that a second resulting magnetic force is substantially aligned with the first hinge, the first and second resulting magnetic forces counteracting the springback torque.

21. An electronic device comprising:
a first body portion having a first face and a second face;
a second body portion having a first face and a second face, the second body portion and the first body portion hinged to each other by a first hinge that hinges a first edge of the first body portion, and a second edge of the second body portion, to each other to facilitate rotation of at least one of the first or second body portions into at least a first configuration where the first face of the first body portion is adjacent the first face of the second body portion, and into a second configuration where the second face of the first body portion is adjacent the second face of the second body portion, wherein the rotation gives rise to a springback torque on one or more of the first or second body portions, the springback torque tending to rotate the one or more of the first or second body portions in a direction opposite that of the rotation;

a first magnet positioned at a third edge of the first body portion without a shunt, the third edge opposite the first edge;

a second magnet to positioned at a fourth edge of the second body portion without a shunt;

a third magnet positioned at the third edge of the first body portion; and a fourth magnet positioned at the fourth edge of the second body portion;

wherein the first and third magnets are placed symmetrically about a first point on the third edge directly across the first body portion from the first hinge so that a first resulting magnetic force of the first and third magnets is substantially aligned with the first hinge, and wherein the second and fourth magnets are placed symmetrically about a second point on the fourth edge directly across the second body portion from the first hinge so that a second resulting magnetic force of the second and fourth magnets is substantially aligned with the first hinge, the first and second resulting magnetic forces counteracting the springback torque, and wherein the first second, third and fourth magnets are configured to hold the first and second body portions to each other in the first and second configurations.

* * * * *